United States Patent
Wang et al.

(10) Patent No.: US 11,531,420 B2
(45) Date of Patent: Dec. 20, 2022

(54) DISPLAY MODULE, MANUFACTURING METHOD THEREOF AND TOUCH DISPLAY DEVICE

(71) Applicants: Chengdu BOE Optoelectronics Technology Co., Ltd., Sichuan (CN); BOE TECHNOLOGY GROUP CO., LTD., Beijing (CN)

(72) Inventors: Kaimin Wang, Beijing (CN); Zhiyong Yang, Beijing (CN); Dexiong Song, Beijing (CN); Shihua Huang, Beijing (CN); Ming Li, Beijing (CN); Jie Xiang, Beijing (CN); Gong Chen, Beijing (CN); Shuzhen Yang, Beijing (CN)

(73) Assignees: CHENGDU BOE OPTOELECTRONICS TECHNOLOGY CO., LTD., Sichuan (CN); Beijing BOE Technology Development Co., Ltd., Beijing (CN)

( * ) Notice: Subject to any disclaimer, the term of this patent is extended or adjusted under 35 U.S.C. 154(b) by 155 days.

(21) Appl. No.: 16/963,976

(22) PCT Filed: Feb. 12, 2020

(86) PCT No.: PCT/CN2020/074859
§ 371 (c)(1),
(2) Date: Jul. 22, 2020

(87) PCT Pub. No.: WO2020/173302
PCT Pub. Date: Sep. 3, 2020

(65) Prior Publication Data
US 2021/0216186 A1    Jul. 15, 2021

(30) Foreign Application Priority Data
Feb. 27, 2019 (CN) .......................... 201910146495.1

(51) Int. Cl.
*G06F 3/041* (2006.01)
*G09G 3/36* (2006.01)
(Continued)

(52) U.S. Cl.
CPC ............ *G06F 3/04164* (2019.05); *B32B 7/12* (2013.01); *B32B 17/06* (2013.01); *B32B 2457/208* (2013.01); *G06F 2203/04103* (2013.01)

(58) Field of Classification Search
CPC ....... G06F 3/04164; G06F 3/038; B32B 7/12; B32B 2457/208; H06G 2203/04103; G09G 3/36; G09G 3/30; G09G 5/00
See application file for complete search history.

(56) References Cited

U.S. PATENT DOCUMENTS

| 9,971,466 B2 | 5/2018 | Du et al. |
| 10,037,114 B2 | 7/2018 | Kim et al. |

(Continued)

FOREIGN PATENT DOCUMENTS

| CN | 203870593 U | 10/2014 |
| CN | 104298396 A | 1/2015 |

(Continued)

OTHER PUBLICATIONS

International Search Report of PCT/CN2020/074859 in Chinese, dated Apr. 26, 2020 with English translation.
(Continued)

*Primary Examiner* — Pegeman Karimi
(74) *Attorney, Agent, or Firm* — Collard & Roe, P.C.

(57) ABSTRACT

A display module, a manufacturing method thereof, and a touch display device are provided. The display module includes: a display panel; a touch panel, including a plurality of wirings, the touch panel being located on a display side of the display panel; and a bonding component between the
(Continued)

display panel and the touch panel, and configured to bond the display panel and the touch panel. A maximum space between two adjacent wirings of the plurality of wirings of the touch panel is not greater than $10\lambda$, and $\lambda$ is the wavelength of light emitted by the display panel.

18 Claims, 3 Drawing Sheets

(51) Int. Cl.
*B32B 7/12* (2006.01)
*B32B 17/06* (2006.01)

(56) References Cited

U.S. PATENT DOCUMENTS

| | | | | |
|---|---|---|---|---|
| 2009/0322704 | A1* | 12/2009 | Anno | G09G 3/36 345/174 |
| 2013/0088453 | A1* | 4/2013 | Park | G06F 3/0446 345/173 |
| 2016/0077619 | A1* | 3/2016 | Li | G02B 5/201 345/173 |
| 2021/0199952 | A1* | 7/2021 | Cho | G02B 5/208 |
| 2022/0027013 | A1* | 1/2022 | Kim | G06F 3/0412 |

FOREIGN PATENT DOCUMENTS

| | | |
|---|---|---|
| CN | 105183259 A | 12/2015 |
| CN | 106462304 A | 2/2017 |
| CN | 107544716 A | 1/2018 |
| CN | 208077142 U | 11/2018 |
| CN | 109634469 A | 4/2019 |

OTHER PUBLICATIONS

Notice of Transmittal of the International Search Report of PCT/CN2020/074859 in Chinese, dated Apr. 26, 2020.
Written Opinion of the International Searching Authority of PCT/CN2020/074859 in Chinese, dated Apr. 26, 2020.
Chinese Office Action in Chinese Application No. 201910146495.1, dated Jul. 6, 2020 with English translation.

* cited by examiner

DISPLAY MODULE, MANUFACTURING METHOD THEREOF AND TOUCH DISPLAY DEVICE

CROSS REFERENCE TO RELATED APPLICATIONS

This application is the National Stage of PCT/CN2020/074859 filed on Feb. 12, 2020, which claims priority under 35 U.S.C. § 119 of Chinese Application No. 201910146495.1 filed on Feb. 27, 2019, the disclosure of which is incorporated by reference.

TECHNICAL FIELD

Embodiments of the present invention relate to a display module, a manufacturing method thereof and a touch display device.

BACKGROUND

A touch screen panel (TSP) refers to a panel with a touch function and it has recently been widely used in various electronic devices to provide touch functions. The view area refers to the visible area that can be observed by the user in the touch display device. Light leakage in the view area is an important factor affecting the appearance of the display and is often used as an indicator for evaluating display panels. The problem of light leakage in the view area is currently a problem that needs to be solved.

SUMMARY

Embodiments of the disclosure provide a display module, a manufacturing method thereof and a touch display device. The display module comprises: a display panel; a touch panel, including a plurality of wirings, the touch panel being on a display side of the display panel; and a bonding component between the display panel and the touch panel, and configured to bond the display panel and the touch panel, wherein, in a direction perpendicular to an extending direction of the wirings, a maximum space between two adjacent wirings of the plurality of wirings of the touch panel is not greater than $10\lambda$, and $\lambda$ is the wavelength of light emitted by the display panel.

In an embodiment of the disclosure, the display panel comprises an effective display area, an orthographic projection of the effective display area on a plane where the touch panel is located does not overlap with an orthographic projections of the plurality of wirings on the plane.

In an embodiment of the disclosure, the touch panel comprises a plurality of touch components and a wiring area on a side of the touch components close to an edge of the display module, and the plurality of wirings are arranged in the wiring area and respectively connected to the plurality of touch components.

In an embodiment of the disclosure, an orthographic projection of an end of the bonding component on the plane falls within an orthographic projection of the wiring area on the plane.

In an embodiment of the disclosure, at least one of the plurality of wirings comprises a strip-shaped main body portion and at least one protrusion portion on at least one side of the main body portion.

In an embodiment of the disclosure, each of the plurality of wirings comprises the main body portion and a plurality of protrusion portions on both sides of the main body portion, and the protrusion portions located on opposite sides of two adjacent main body portions have a staggered distribution in an extending direction of the main body portions.

In an embodiment of the disclosure, at least one of the plurality of protrusions comprises at least an outline of at least one of an arc and a polyline.

In an embodiment of the disclosure, an orthographic projection of at least one of the plurality of protrusions on the plane have a shape of semicircle.

In an embodiment of the disclosure, the semicircle has a radius of approximately ½ of a space between the main body portions of two adjacent ones of the plurality of wirings.

In an embodiment of the disclosure, the main body portion and the protrusion portion in each of the plurality of wirings have an integral structure.

In an embodiment of the disclosure, the maximum space d between two adjacent wirings in the plurality of wirings satisfies $3\lambda \leq d \leq 10\lambda$.

In an embodiment of the disclosure, the display panel is configured to emit visible light and the maximum space d satisfies $1.14\ \mu m \leq d \leq 7.6\ \mu m$.

In an embodiment of the disclosure, the display module comprises a driving circuit located at an edge on one side, in an area in the wiring area close to the driving circuit, the main body portion in a direction perpendicular to the extending direction of the wirings has a line width $w \geq 12\ \mu m$.

In an embodiment of the disclosure, in the area in the wiring area close to the driving circuit, the line widths of the main body portions of the plurality of wirings are approximately equal.

In an embodiment of the disclosure, the bonding component comprises an optical clear adhesive.

In an embodiment of the disclosure, the wirings comprise a reflective conductive material.

In another aspect, embodiments of the disclosure provide a touch display device comprising any display module as mentioned above.

In another aspect, embodiments of the disclosure provide a method for manufacturing a display module, the display module comprising a display panel, a touch panel, and a bonding component, wherein the touch panel is on a display side of the display panel, and the bonding component is between the display panel and the touch panel, and configured to bond the display panel and the touch panel, wherein, upon forming the touch panel, the manufacturing method comprises: forming a wiring precursor layer; coating photoresist on the wiring precursor layer; exposing the photoresist through a mask, and developing the exposed photoresist; etching the wiring precursor layer to form a plurality of wirings by using the photoresist pattern obtained after development as a mask, wherein, in a direction perpendicular to the extending direction of the wirings, a maximum space between two adjacent wirings of the plurality of wirings is not greater than $10\lambda$, where $\lambda$ is the wavelength of light emitted by the display panel; and removing the photoresist.

In another aspect, embodiments of the disclosure provide a display module, comprising: a display panel; a touch panel, including a plurality of wirings, the touch panel being on a display side of the display panel; and a bonding component between the display panel and the touch panel, and configured to bond the display panel and the touch panel, wherein each of the plurality of wirings comprises a main body portion and a plurality of protrusions on both sides of the main body portion, the main body portions of the plurality of wirings are parallel to each other, and the protrusions on opposite sides of adjacent wirings in a plurality of wirings have a staggered distribution in an extending direction of the main body portions.

In an embodiment of the disclosure, the protrusions located the on opposite sides of the adjacent wirings have vertices on a side close to the adjacent wirings which are located approximately on a straight line, and the straight line is parallel to the extending direction of the main body portions.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1A:
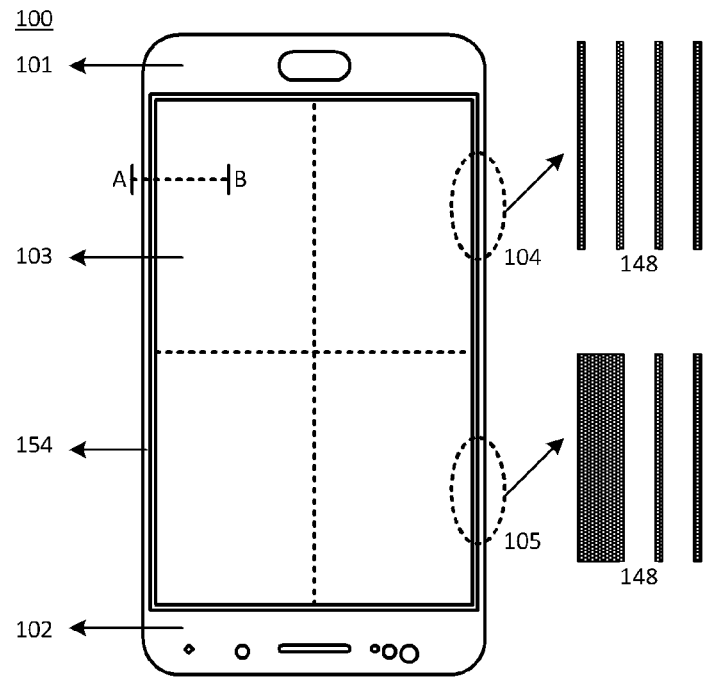
FIG. 1A illustrates a schematic structural diagram of a touch display device.

FIG. 1A schematically illustrates a touch display device 100, such as a mobile phone with a touch function. As illustrated in FIG. 1A, the touch display device 100 comprises a first end 101 and a second end 102 opposite to the first end. For example, the second end 102 is the end of the earpiece of the mobile phone.

Figure 1B:
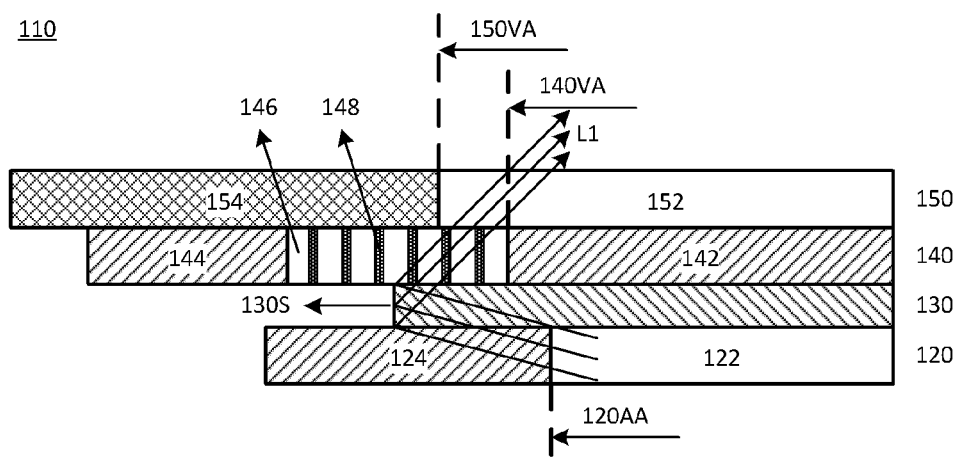
FIG. 1B illustrates a schematic cross-sectional view of the display module taken along line A-B in FIG. 1A.

FIG. 1B schematically illustrates a cross-sectional view of the display module 110 taken along line A-B in FIG. 1A. As illustrated in FIGS. 1A-1B, the display device 100 comprises a display module 110 including a display panel 120, a bonding component 130, a touch panel 140, and a cover plate 150 stacked in sequence.

As illustrated in FIG. 1B, in the display module 110, the display panel 120 comprises a display unit 122 such as a liquid crystal display unit, and a circuit structure 124 electrically connected to the display unit 122.

As illustrated in FIG. 1B, the display module 110 further comprises a bonding component 130 on the display panel 120 and a touch panel 140 on the side of the bonding component 130 away from the display panel 120. During the assembly process, the bonding component 130 is located between the display panel 120 and the touch panel 140 to bond the display panel 120 and the touch panel 140.

As illustrated in FIG. 1B, the touch panel 140 comprises a touch component 142 and a dummy touch component 144. The touch component 142 is transparent and is formed of a transparent material such as Indium Tin Oxide (ITO). The dummy touch component 144 is a residual touch component, for example, it is generally a component in the area remaining after the touch panel 140 is special-shaped cutting. The dummy touch component 144 usually has no actual function, and the width is, for example, about 30 µm. In a direction parallel to the plane where the display panel 120 is located, the touch component 142 is located inside the dummy touch component 144, and the dummy touch component 144 is located at the edge of the touch panel 140. The touch panel 140 further comprises a wiring area 146 between the touch component 142 and the dummy touch component 144, and the wiring 148 is arranged in the wiring area 146. The wiring area 146 is generally light-transmissive, and the width is, for example, about 520 µm.

As illustrated in FIGS. 1A and 1B, the display module 110 further comprises, for example, a packaging cover plate 150 on the touch panel 140 away from the display panel 120. The cover plate 150 comprises a cover plate light-transmitting area 152 and an opaque cover plate frame 154. The cover plate 150 is usually formed of glass, and the cover plate frame 154 of the cover plate 150 defines, for example, a rectangular view area 103.

As illustrated in FIGS. 1A and 1B, in the normal direction of the cover plate 150, that is, in a direction perpendicular to the surface of the cover plate 150, the projection of the display unit 122 of the display panel 120 on the cover plate 150 defines the effective display area 120AA. The projection of the touch component 142 of the touch panel 140 on the cover plate 150 defines the view area 140VA of the touch panel. In addition, the cover plate light-transmitting area 152 of the cover plate 150 defines the cover plate ow area 150VA.

In an ideal situation, the effective display area 120AA, the touch panel view area 140VA and the cover view area 150VA coincide with each other. However, due to dimensional tolerances or attachment accuracy, the effective display area 120AA, the touch panel view area 140VA, and the cover view area 150VA do not coincide. The edge of the effective display area 120AA, the edge of the touch panel view area 140VA, and the edge of the cover view area 150VA have different distances from the edge of the display module 110.

As illustrated in FIG. 1B, the bonding component 130 is, for example, Optical Clear Adhesive (OCA), and the thickness of the optical clear adhesive is, for example, 100 to 110 µm. In order to prevent the bonding component 130 from overflowing from the edge of the panel upon the display panel 120 and the touch panel 140 being combined, bonding component 130 is usually retracted relative to the display panel 120 and the touch panel 140. For example, as illustrated in FIG. 1B, the end 130S of the bonding component 130 is farther from the lateral side of the display module 110 than the ends (such as edges) of the display panel 120 and the touch panel 140.

As illustrated in FIG. 1B, the bonding component 130 is usually cut to a suitable size and is applied between the display panel 120 and the touch panel 140. Upon the display module 110 working, the display unit 122 of the display panel 120 emits light. Because the end 130S formed after cutting the bonding component 130 is not smooth, the light emitted by the display unit 122 will be diffusely reflected upon being irradiated to the end 130S and it may easily cause light leakage in the view area.

For example, the cover plate frame 154 of the cover plate 150 is coated with light-shielding ink (not shown). In the case that the projection of the end 130S of the bonding component 130 on the cover plate 150 falls within the projection of the dummy touch component 144 on the cover plate 150, for example, in the case that the end 130S is located directly under the dummy touch component 144, the light-shielding ink blocks light diffusely reflected from the end 130S, thereby preventing light leakage in the view area of the cover plate and the view area of the touch panel.

As illustrated in FIG. 1B, the projection of the end 130S of the bonding component 130 on the cover plate 150 falls within the projection of the wiring area 146 on the cover plate 150. For example, the end 130S is located directly under the wiring area 146. In this case, light diffusely reflected from the end 130S is easily transmitted through the wiring area 146, reaching the touch panel view area 140VA and the cover view area 150VA, thereby causing light leakage in the view area, as illustrated by the light L1 in FIG. 1B. Light leakage in the view area affects the appearance and user experience of the display module.

In the case that the end 130S of the bonding component 130 is further retracted, and, for example, the orthographic projection of the end 130S of the bonding component 130 on the cover plate 150 is within the orthographic projection of the touch component 142 on the cover plate 150, for example, in the case that the end 130S is directly below the touch component 142, since the touch component 142 is usually transparent, the light diffusely reflected from the end 130S will be transmitted through the touch component 142 to reach the touch panel view area 140VA and the cover view area 150VA causing light leakage in the view area. Compared with the situation as illustrated in FIG. 1B, the light leakage in the view area is shifted toward the inner side of the display module 110.

As illustrated in FIGS. 1A and 1B, the wiring area 146 comprises a first wiring area 104 near the first end 101 and a second wiring area 105 near the second end 102. The wiring 148 in the touch panel 140 generally adopts a linear wiring method. For example, the display module 110 may comprise upper and lower regions (taking the first end 101 above the second end 102 as an example, where "upper" and "lower" are relative and interchangeable), and the touch panel 140 located in each region comprises multiple row touch components 142. One side of each row of touch components 142 in the upper and lower regions is connected to the wiring 148 to communicate with the driving circuit 211 at the first end 101 of the touch display device 100.

For example, the first end 101 is close to the driving circuit, and the wirings 148 connected to each row of touch components 142 converge at the first end 101 so that the wirings 148 of the first end 101 are sparse and the gap is large. In the direction from the first end 101 to the second end 102, the number of wirings in the area of the wiring area 146 that is further away from the first end 101 is less, and this decrease is achieved by merging of two adjacent wirings. Therefore, the number of wirings 148 in the first wiring area 104 is greater than the number of wirings 148 in the second wiring area 105. Taking the touch display device 100 of FIG. 1A as an example, the first wiring area 104 comprises, for example, four wirings 148, and the second wiring area 105 is reduced to three, for example, the partial wiring area closest to the second end 102 may comprise only one wiring.

Figure 2:
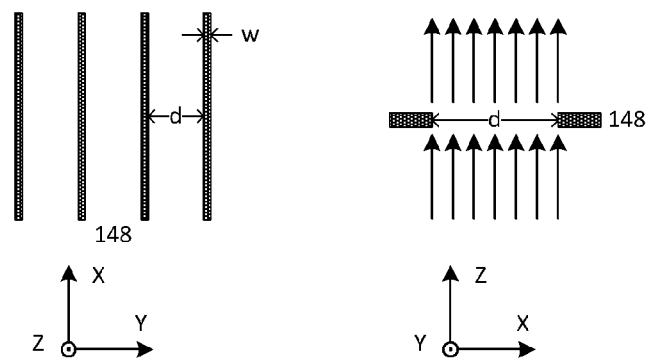
FIG. 2 illustrates a schematic diagram of the wiring in the wiring area of the touch display device as illustrated in FIG. 1A.

FIG. 2 schematically illustrates the wiring 148 of the first wiring area 104 of the touch display device as illustrated in FIG. 1A. As illustrated in the left part of FIG. 2, the wiring 148 extends in the X direction and has a space d in the Y direction perpendicular to the X-direction. As illustrated in the right part of FIG. 2, due to the sparse arrangement of the wiring 148 and the larger space d, the light diffusely reflected from the end 130S is transmitted through the gap between the wirings 148, easily causing light leakage in the view area. The line width w of the wiring 148 is, for example, 8 μm, and the space d is, for example, 12 μm, which is much larger than $10^3\lambda$, and the light passing through the gap of the wiring 148 transmits almost straight. In the touch display device illustrated in FIG. 1A, light leakage in the view area of the first wiring area 104 is more serious than that of the second wiring area 105.

In the research, the inventors of the present application found that in order to reduce light leakage in the view area, one method is to increase the width of the cover plate frame 154 or apply light-shielding ink on the cover plate 150. Applying ink to the area of the cover plate 150 where there is light leakage in the view area is only used as a temporary means to achieve the purpose of shielding light leakage and is more difficult. This method poses a new problem, that is, it cannot meet the narrow frame design requirements. Another method is to cover the wiring area 146 of the touch panel 140 with light-shielding ink. In this method, during the process of covering the shading ink, the ink may be sputtered onto the touch component 142, resulting in a new appearance defect.

Embodiments of the present disclosure provide a display module, a method for manufacturing the same, and a touch display device including the display module. The display module comprises a display panel, a touch panel and a bonding component. The touch panel comprises a plurality of wirings, and the touch panel is located on the display side of the display panel; the bonding component is located between the display panel and the touch panel and is configured to bond the display panel and the touch panel. In a direction perpendicular to the extending direction of the wirings, the maximum space between two adjacent wirings in the plurality of wirings of the touch panel is not greater than $10\lambda$, where $\lambda$ is the wavelength of light emitted by the display panel. The display module provided by the embodiments of the present disclosure can reduce light leakage in the view area as much as possible without affecting the design of the frame by increasing the line width of the wirings.

Hereinafter, the display module, the method for manufacturing the same and the touch display device including the display module provided by the embodiments of the present disclosure will be described with reference to the drawings.

Figure 3:
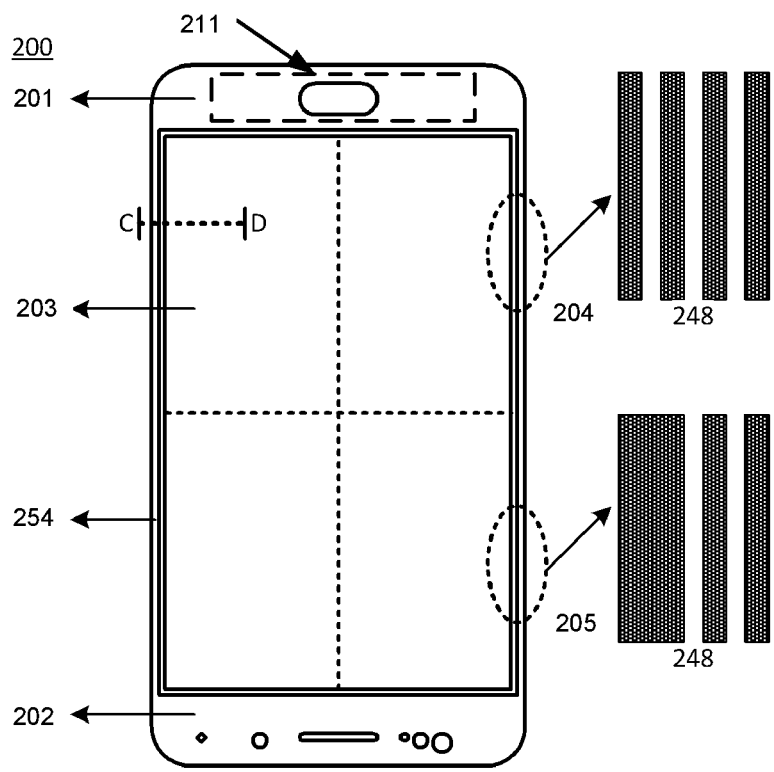
FIG. 3 illustrates a schematic structural diagram of a touch display device according to an embodiment of the present disclosure.

FIG. 3 schematically illustrates a touch display device 200 according to an embodiment of the present disclosure. As illustrated in FIG. 3, the touch display device 200 according to the embodiment of the present disclosure is, for example, a mobile phone with a touch function, and may comprise a first end 101 and a second end 102 opposite to the first end. For example, the second end 202 is the end of the mobile phone with the earpiece, and the first end 201 may comprise a driving circuit 211.

Figure 4:
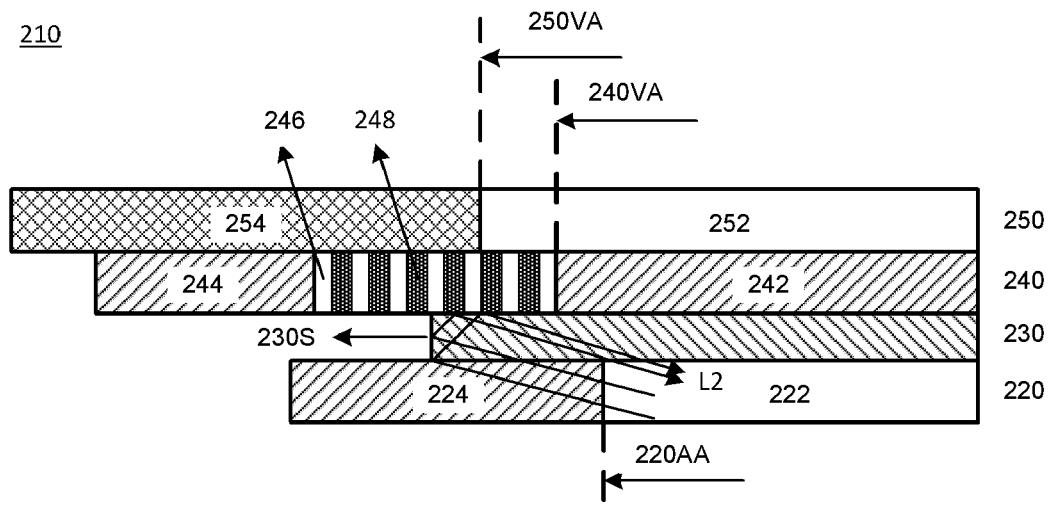
FIG. 4 illustrates a schematic cross-sectional view of the display module taken along line C-D in FIG. 3.

FIG. 4 schematically illustrates a cross-section view of a display module 210 taken along line C-D in FIG. 3. As illustrated in FIGS. 3 and 4, the display device 200 comprises the display module 210. As illustrated in FIG. 4, the display module 210 comprises a display panel 220, a bonding component 230, a touch panel 240, and a cover plate 250 stacked in this order. The display panel 220 comprises a display unit 222 and a circuit structure 224 electrically connected to the display unit 222. The bonding component 230 comprised in the display module 210 is located between the display panel 220 and the touch panel 240 to bond and fix the display panel 220 and the touch panel 240.

For example, as illustrated in FIG. 4, the touch panel 240 comprises a touch component 242, a dummy touch component 244 and a wiring area 246. The dummy touch component 244 is located on the side of the touch component 242 away from the center of the touch panel 240. And the wiring area 246 is located between the touch component 242 and the dummy touch component 244, and the wiring 248 is arranged in the wiring area 246.

For example, the touch component 242 is transparent and is formed of a transparent material such as ITO (Indium Tin Oxide). The dummy touch component 244 is a residual touch component, for example, it may be a component in an area remaining after the special-shaped cutting of touch panel 240. The dummy touch component 244 usually has no actual function, and the width is, for example, about 30 μm. In a direction parallel to the plane where the display panel 220 is located, the touch component 242 is located at the inner side of the dummy touch component 244, and the dummy touch component 244 is located at the edge of the touch panel 240. For example, the wiring area 246 may be a partially transparent region, and has a width of, for example, about 520 μm.

For example, as illustrated in FIGS. 3 and 4, the cover plate 250 comprises a cover plate light-transmitting area 252 and an opaque cover plate frame 254. The cover plate 250 may be formed of glass, and the cover plate frame 254 of the cover plate 250 defines, for example, a rectangular view area 203. The orthographic projection of the end 230S of the bonding component 230 on the plane where the touch panel 240 is located is within the orthographic projection of the wiring area 246 on the above-mentioned plane.

For example, as illustrated in FIG. 4, the display panel 220 comprises an effective display area 220AA. For example, the projection of the display unit 222 of the display panel 220 on the cover plate 250 defines the effective display area 220AA. The touch panel 240 comprises a touch panel view area 240VA. For example, the projection of the touch component 242 on the cover plate 250 defines the touch panel view area 240VA. The cover plate 250 comprises a cover plate view area 250VA. For example, the cover plate light-transmitting area 252 defines the cover plate view area 250VA.

For example, as illustrated in FIG. 4, the orthographic projection of the wiring 248 on the plane where the touch panel 240 is located does not overlap with the orthographic projection of the effective display area 220AA on the plane mentioned above, that is, the wiring 248 is located in the non-display area and outside the effective display area. For example, the orthographic projection of the wiring 248 on the plane mentioned above falls within the orthographic projection of the circuit structure 224 on the plane mentioned above.

In an ideal situation, the effective display area 220AA, the touch panel view area 240VA and the cover plate view area 250VA coincide with each other. However, due to dimensional tolerances or attachment accuracy, the effective display area 220AA, the touch panel view area 240VA, and the cover plate view area 250VA do not coincide. The edge of the effective display area 220AA, the edge of the touch panel view area 240VA and the edge of the cover plate view area 250VA have different distances from the edge of the display module 210.

For example, according to an embodiment of the present disclosure, as illustrated in FIG. 3, the wiring area 246 comprises a first wiring area 204 near the first end 201 and a second wiring area 205 near the second end 202. Similar to the wiring 148 of the touch display device 100 illustrated in FIG. 1A, in the touch display device 200, the amount of wirings 248 in the first wiring area 204 is greater, and the amount of the wirings 248 in the second wiring area 205 is less.

For example, as illustrated in FIG. 3, in the area of the wiring area 246 near the driving circuit 211, such as the first wiring area 204, the wirings 248 have an approximately equal width.

Figure 5A:
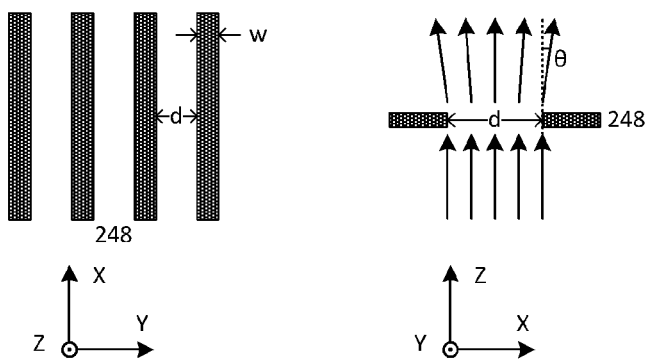
FIG. 5A and FIG. 5B illustrate schematic diagrams of wirings in the wiring area of the touch display device as illustrated in FIG. 3.

FIG. 5A schematically illustrates an example of an embodiment of the present disclosure, the wiring 248 of the first wiring area 204 of the touch display device 200 illustrated in FIG. 3. According to an embodiment of the present disclosure, the maximum space d between adjacent wirings 248 satisfies $3\lambda \leq d \leq 10\lambda$, where $\lambda$ is the wavelength of light emitted by the display panel 120. The maximum space between adjacent wirings here refers to the maximum space between two adjacent wirings in a direction perpendicular to the extending direction of the wirings.

For example, as illustrated in FIG. 5A, in the case that the wirings 248 are wirings with equal line widths everywhere, the space between adjacent wirings 248 is equal at each position.

For example, as illustrated in FIG. 5A, the light emitted by the display unit 220 is diffusely reflected at the end 230S of the bonding component 230 and then is irradiated to the wiring 248. The light incident on the wiring 248 can be decomposed into two orthogonal polarized light components, that is, the first polarized light component in the XY plane and the second polarized light component in the Z direction. Since the maximum space d between adjacent wirings 248 satisfies $d \leq 10\lambda$, incident light diffracts upon passing through the gap between wirings 248. The direction deflection of the second polarized light component caused by diffraction is defined as the divergence angle $\Delta\theta$, that is, the angle between the direction of the second polarized light component after diffraction and the direction of the second polarized light component of the incident light. The divergence angle $\Delta\theta$ and the space d of the wiring 248 satisfy the relationship: $\Delta\theta \approx \lambda/d$.

From this relationship, it can be seen that the divergence angle $\Delta\theta$ is inversely proportional to the space d between adjacent wirings 248. In the case that the space d of the wirings is larger, for example, $d > 15\lambda$ (as the situation illustrated in FIG. 2), the incident light does not diffract, or due to the smaller divergence angle $\Delta\theta$ caused by diffraction, the light incident on the wiring 248 passes through the gap between the wirings 248, thereby causing light leakage in the view area.

In the embodiment of the present disclosure, the space d of the wiring 248 is designed to be $d \leq 10\lambda$, so that the divergence angle $\Delta\theta \geq 0.1$. Therefore, the second polarized light component is significantly deflected after diffraction and propagates in a direction invisible to the user, so that light leakage in the view area can be minimized Considering the factor of the manufacturing process, the space d of the wiring 248 can be designed to be $3\lambda \leq d \leq 10\lambda$.

For example, the space d of the wiring 248 can be determined according to the relationship $3\lambda \leq d \leq 10\lambda$. The wavelength range of visible light is usually from 0.38 to 0.76

µm. In this case, the space d of the wiring 248 can satisfy 1.14 µm≤d≤7.6 µm. After the space d of the wiring 248 is determined, the line width w of the wiring 248 can be determined.

For example, in the embodiment of the present disclosure, the wiring 248 may be formed of reflective conductive material. The reflective conductive material comprises, for example, a metal, alloy, or conductive oxide with reflective properties.

FIG. 4 schematically illustrates the effect of suppressing light leakage in the view area in the display module 210 of the embodiment of the present disclosure. Upon the display module 210 being in operation, the display unit 122 of the display panel 220 emits light, and the light is diffusely reflected from the end 230S of the bonding component 230 to the wiring area 246. Since the wiring 248 has reflection characteristics, the light irradiated on the wire 248 is reflected by the wiring, as illustrated by the light L2 in FIG. 4. Since the space d of the wiring 248 is set to be smaller, the light irradiated to the gap between the wirings 248 is diffracted, so that the second polarized light component is deflected to a direction invisible to the user. Thus, light leakage in the view area of the first wiring area 204 and the second wiring area 205 is effectively suppressed.

For example, in the embodiment illustrated in FIG. 5A, the line width w of the wiring 248 in the first wiring area 204 is, for example, w≥12 µm. Compared with the situation illustrated in FIG. 2, the line width w of the wiring 248 increases. This helps to more effectively block or reflect light diffusely reflected from the end 230S of the bonding component 230, thereby effectively preventing light leakage in the view area.

Figure 5B:
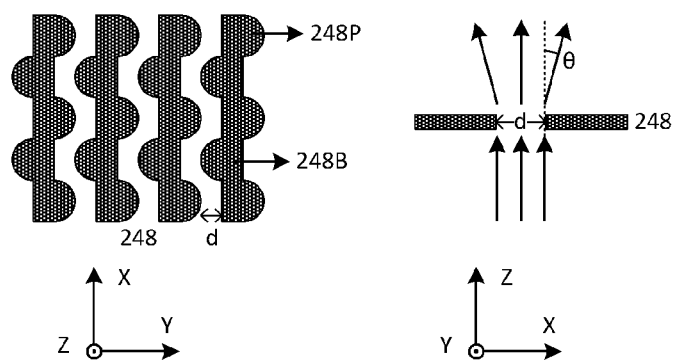

For example, FIG. 5B schematically illustrates another example of the embodiment of the present disclosure, the wiring 248 of the first wiring area 204 of the touch display device 200 illustrated in FIG. 3. In this example, at least one wiring 248 comprises a strip-shaped main body portion 248B and at least one protrusion 248P on at least one side of the main body portion 248B. For example, the plurality of strip-shaped main body portions 248B comprised in the plurality of wirings 248 are parallel to each other. In the case that the strip-shaped main body portions 248B have equal line widths at each position, the space between adjacent main body portions 248B is equal.

For example, the main body portion 248B and the protrusion portion 248P comprised in each wiring 248 may be an integral structure to facilitate manufacturing.

For example, as illustrated in FIG. 5B, each wiring 248 comprises a main body portion 248B and a plurality of protrusions 248P on one side or both sides of the main body portion. The protrusion 248P can increase the light intercepting area of the wiring 248, and it is beneficial to prevent light leakage in the view area.

For example, as illustrated in FIG. 5B, the outline of at least one of the plurality of protrusions 248P may comprise at least one of an arc and a polyline, that is, the outline of the protrusion 248P may comprise at least one of an arc and a polyline except for the position overlapping with the strip-shaped main body portion 248B. FIG. 5B schematically illustrates that the outline of the protrusion 248P is an arc.

For example, as illustrated in FIG. 5B, the cross-section of the protrusion 248P on a plane parallel to the touch panel 140 is semicircular, that is, the shape of the orthographic projection of the protrusion 248P on the plane mentioned above comprises a semicircle. The semicircle can make the most of the area between the main body portions of the wiring, thereby maximizing the shading effect. Of course, the embodiments of the present disclosure are not limited to this, and the cross-section of the protrusion may be any regular or irregular shape, such as a rectangle, a trapezoid, or the like.

For example, as illustrated in FIG. 5B, each wiring 248 comprises a plurality of protrusions 248P located on both sides of the main body portion 248B, and a plurality of protrusions 248P located on opposite sides of the two adjacent main body portions 248B present staggered distribution in the extending direction of the main body portion (that is, the X direction). As a result, the protrusion 248P more effectively fills the gap between the main body portions 248B of the wirings 248, and it is beneficial to improving the light-shielding effect.

For example, as illustrated in FIG. 5B, the radius of the semi-circle of the protruding portion 248P is approximately ½ of the space d between the main body portions 248B of the adjacent wirings 248, thereby not only ensuring the shading area but also preventing the short circuit between adjacent wirings due to small space.

For example, as illustrated in FIG. 5B, the plurality of protrusions 248P on the opposite sides of adjacent wirings 248 have vertices on the side close to the adjacent wirings 248 located approximately on a straight line, and the straight line is parallel to the extending direction of the main body portion 248B, consequently not only ensuring the shading area, but also preventing the short circuit between the adjacent wirings from being too small. In the case that the shapes and sizes of the plurality of protrusions are the same, the maximum dimension of the protrusions in the direction perpendicular to the extending direction of the main body portion may be half of the space between the adjacent main body portions so that the vertices of the plurality of protrusions located between the adjacent main body portions away from the main body portion are on the same straight line. Upon the sizes of the multiple protrusions being not exactly the same, along the direction perpendicular to the extension direction of the main body portion, the sum of the maximum size of one protrusion on one wiring and the maximum size of the protrusion adjacent to it and on the other wiring may be the space between adjacent main body parts.

For example, the orthographic projections of the plurality of protrusions located on opposite sides of adjacent wirings on a straight line perpendicular to the extending direction of the main body portion overlap to further increase the light-shielding area.

As described above, the protrusion 248P increases the light intercepting area by the wiring 248. In addition, the protrusion 248P reduces the space d between the wirings 248, so that the divergence angle Δθ increases, as a result, it is beneficial to suppressing light leakage in the view area, as illustrated in the right part of FIG. 5B.

In the example illustrated in FIG. 5B, the space between adjacent wirings 248 at each position may be the same or different. Upon the space at each position is different, it is acceptable upon the maximum spacing being not greater than 10λ. The maximum space between adjacent wirings 248 refers to the space between adjacent wirings in the Y direction. It may be the space between the main body part of one wiring and the protrusion of another wiring, the space between two main body portions of two wirings, or also the space between the two protrusions of the two wirings.

The embodiment of the present disclosure also provides a method for manufacturing a display module. The display module may be the display module illustrated in FIG. 4, and it comprises a display panel, a touch panel and a bonding component. The touch panel is located on the display side of the display panel. The bonding component is located between the display panel and the touch panel and is configured to bond the display panel and the touch panel. Upon forming a touch panel, the method comprises: forming a wiring precursor layer; applying a photoresist coating on the wiring precursor layer; exposing the photoresist mentioned above using a mask, developing the exposed photoresist; using the photoresist pattern obtained after development as a mask, etching the wiring precursor layer to form the plurality of wirings, wherein the maximum space between two adjacent wirings of the plurality of wirings as described is not greater than 10λ, where λ is the wavelength of light emitted by the display panel; and stripping the photoresist. The display module in the embodiments of the present disclosure may be used for a suitable type of touch display device, including but not limited to mobile phones, tablet computers, laptop computers, navigators, cameras, televisions, etc.

The display module manufactured by the method provided by the embodiment of the present disclosure can reduce the light leakage of the view area as much as possible without affecting the design of the frame by increasing the line width of the wiring.

Another embodiment of the present disclosure provides a display module, for example, it may comprise a display panel 220, a bonding component 230, a touch panel 240, and a cover plate 250 stacked in sequence as illustrated in FIG. 4. The display panel 220 comprises a display unit 222 and a circuit structure 224 electrically connected to the display unit 222. The bonding component 230 comprised in the display module 210 is located between the display panel 220 and the touch panel 240 to bond and fix the display panel 220 and the touch panel 240. The display panel, the bonding component and the cover plate in this embodiment may have the same features as the display panel, the bonding component and the cover plate described in the above embodiment and will not be repeated here.

The touch panel in this embodiment comprises multiple wirings. Each wiring comprises a main body portion and a plurality of protrusions on both sides of the main body portion, and a plurality of protrusions located on opposite sides of two adjacent main body portions present staggered distribution in the extending direction of the main body portion. As a result, the protrusion 248P more effectively fills the gap between the main body portions 248B of the wirings 248, and it is beneficial to improving the light-shielding effect. The wiring in this embodiment may be as illustrated in FIG. 5B and the protrusion may increase the light intercepting area of the wiring, preventing light leakage in the view area.

For example, the outline of at least one of the plurality of protrusions may comprise at least one of arcs and polylines, that is, the outline of the protrusions may comprise at least one of arcs and polylines except for the position overlapping with the strip-shaped main body portion.

For example, the cross-section of the protrusion on a plane parallel to the touch panel is semicircular, that is, the shape of the orthographic projection of the protrusion on the plane mentioned above comprises a semicircle. The semicircle can make the most of the area between the main body portions of the wiring, thereby maximizing the shading effect. Of course, the embodiments of the present disclosure are not limited to this, and the cross-section of the protrusion may be any regular or irregular shape, such as a rectangle, a trapezoid, or the like.

For example, the vertices of the plurality of protrusions on the opposite sides of adjacent wirings on the side close to the adjacent wirings are located approximately on a straight line, and the straight line is parallel to the extending direction of the main body portion, consequently not only ensuring the shading area, but also preventing the short circuit between the adjacent wirings from being too small Upon the shapes and sizes of the plurality of protrusions being the same, the maximum dimension of the protrusions in the direction perpendicular to the extending direction of the main body portion may be half of the space between the adjacent main body portions so that the vertices of the plurality of protrusions located between the adjacent main body portions away from the main body portion are on the same straight line. Upon the sizes of the multiple protrusions being not exactly the same, along the direction perpendicular to the extension of the main body portion, the sum of the maximum size of one protrusion on one wiring and the maximum size of the protrusion adjacent to it and on the other wiring may be the space between adjacent main body parts.

For example, the orthographic projections of the plurality of protrusions located on opposite sides of adjacent wirings on a straight line perpendicular to the extending direction of the main body portion overlap to further increase the light-shielding area.

In summary, the protrusion increases the light intercepting area by the wiring. In addition, the protrusion reduces the space between the wirings, so that the divergence angle increases, as a result, it is beneficial to suppressing light leakage in the view area.

The embodiments of the present disclosure provide a display module, its manufacturing method and a touch display device including the display module. The display module comprises a display panel, a touch panel, and a bonding component. The touch panel comprises multiple wirings. The bonding component is located between the display panel and the touch panel and is configured to bond the display panel and the touch panel. The space d between two adjacent wirings of the multiple wirings of the touch panel is not greater than 10λ, and λ is the wavelength of light emitted by the display panel. By designing the space of the wirings to be d≤10λ, thus, upon the light diffusely reflected by the end of the bonding component being irradiated at the gap between the wirings, a significant diffraction phenomenon occurs to cause a significant deflection, resulting to avoid the light leakage in the view area.

According to the embodiments of the present disclosure, by reducing the space between the plurality of wirings of the touch panel, on the one hand, the light-shielding area of the wirings is increased to reduce the light transmittance, and on the other hand, the divergence angle of the transmitted light is increased, thereby avoiding the light leakage in the view area caused by the problem of the bonding precision of the bonding components. In addition, the solution does not affect the narrow frame design of the display module and the touch display device.

The foregoing is only the preferred embodiments of the present invention and not intended to limit the scope of protection of the present invention. Any change or replacement that may be easily thought of by those skilled in the art within the technical scope disclosed by the present invention shall fall within the scope of protection of the present invention. Therefore, the scope of protection of the present invention shall be defined by the appended claims.

The following points should be noted:

(1) Only the structures relevant to the embodiments of the present invention are involved in the accompanying drawings of the embodiments of the present invention, and other structures may refer to the prior art.

(2) The features of the same embodiment or different embodiments of the present disclosure may be mutually combined without conflict.

The foregoing is merely exemplary embodiments of the invention, but is not used to limit the protection scope of the invention. The protection scope of the invention shall be defined by the attached claims.

The invention claimed is:

1. A display module, comprising:
a display panel;
a touch panel, including a plurality of wirings, the touch panel being on a display side of the display panel; and
a bonding component between the display panel and the touch panel, and configured to bond the display panel and the touch panel,
wherein, in a direction perpendicular to an extending direction of the wirings, a maximum space between two adjacent wirings of the plurality of wirings of the touch panel is not greater than 10λ, and λ is the wavelength of light emitted by the display panel.

2. The display module according to claim 1, wherein the display panel comprises an effective display area, an orthographic projection of the effective display area on a plane where the touch panel is located does not overlap with an orthographic projections of the plurality of wirings on the plane.

3. The display module according to claim 2, wherein the touch panel comprises a plurality of touch components and a wiring area on a side of the touch components close to an edge of the display module, and the plurality of wirings are arranged in the wiring area and respectively connected to the plurality of touch components.

4. The display module according to claim 3, wherein an orthographic projection of an end of the bonding component on the plane falls within an orthographic projection of the wiring area on the plane.

5. The display module according to claim 3, wherein at least one of the plurality of wirings comprises a strip-shaped main body portion and at least one protrusion portion on at least one side of the main body portion.

6. The display module according to claim 5, wherein each of the plurality of wirings comprises the main body portion and a plurality of protrusion portions on both sides of the main body portion, and the protrusion portions located on opposite sides of two adjacent main body portions have a staggered distribution in an extending direction of the main body portions.

7. The display module according to claim 6, wherein at least one of the plurality of protrusions comprises at least an outline of at least one of an arc and a polyline.

8. The display module according to claim 7, wherein an orthographic projection of at least one of the plurality of protrusions on the plane have a shape of semicircle.

9. The display module according to claim 8, wherein the semicircle has a radius of approximately ½ of a space between the main body portions of two adjacent ones of the plurality of wirings.

10. The display module according to claim 6, wherein the main body portion and the protrusion portion in each of the plurality of wirings have an integral structure.

11. The display module according to claim 5, wherein the display module comprises a driving circuit located at an edge on one side, in an area in the wiring area close to the driving circuit, the main body portion in a direction perpendicular to the extending direction of the wirings has a line width w≥12 μm.

12. The display module according to claim 11, wherein, in the area in the wiring area close to the driving circuit, the line widths of the main body portions of the plurality of wirings are approximately equal.

13. The display module according to claim 1, wherein the maximum space d between two adjacent wirings in the plurality of wirings satisfies 3λ≤d≤10λ.

14. The display module according to claim 13, wherein the display panel is configured to emit visible light and the maximum space d satisfies 1.14 μm≤d≤7.6 μm.

15. The display module according to claim 1, wherein the bonding component comprises an optical clear adhesive.

16. The display module according to claim 1, wherein the wirings comprise a reflective conductive material.

17. A touch display device comprising the display module according to claim 1.

18. A method for manufacturing a display module, the display module comprising a display panel, a touch panel, and a bonding component, wherein the touch panel is on a display side of the display panel, and the bonding component is between the display panel and the touch panel, and configured to bond the display panel and the touch panel,
wherein, upon forming the touch panel, the manufacturing method comprises:
forming a wiring precursor layer;
coating photoresist on the wiring precursor layer;
exposing the photoresist through a mask, and developing the exposed photoresist;
etching the wiring precursor layer to form a plurality of wirings by using the photoresist pattern obtained after development as a mask, wherein, in a direction perpendicular to the extending direction of the wirings, a maximum space between two adjacent wirings of the plurality of wirings is not greater than 10λ, where λ is the wavelength of light emitted by the display panel; and
removing the photoresist.

* * * * *